United States Patent Office 3,507,865
Patented Apr. 21, 1970

3,507,865
3-HYDROXY- AND 3-MERCAPTOPYRAZINAMIDO-GUANIDINES THE CORRESPONDING ETHERS AND THIOETHERS AND PROCESSES FOR THEIR PREPARATION
James H. Jones, Blue Bell, and Edward J. Cragoe, Jr., Lansdale, Pa., assignors to Merck & Co., Inc., Rahway, N.J., a corporation of New Jersey
No Drawing. Filed Apr. 27, 1967, Ser. No. 634,105
Int Cl. C07d 51/76
U.S. Cl. 260—250           17 Claims

ABSTRACT OF THE DISCLOSURE

3 - hydroxy- and 3 - mercaptopyrazinamidoguanidines and corresponding ethers and thioethers are described. These compounds which are optionally substituted on the 5 and/or 6-position of the pyrazine nucleus are prepared either by treatment of the corresponding ester with an aminoguanidine which may or may not carry substituents, or in the case of 3-hydroxy compounds, by diazotization of a 3-aminopyrazinamidoguanidine. The products have utility as diuretic agents in the treatment of disorders conducive to diuretic and/or saluretic therapy.

---

This invention relates to pyrazinamidoguanidines which can be represented by the following structural formula:

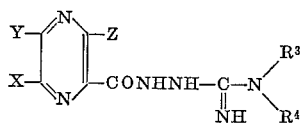

and pharamaceutically acceptable acid additon salts thereof, especially the hydrochloride salts, wherein Z represents (a) $OR^7$ wherein $R^7$ represents
  (1) hydrogen,
  (2) lower alkyl of from 1 to 5 carbon atoms,
  (3) phenyl-lower alkyl, and
(b) $SR^8$ wherein $R^8$ represents
  (1) hydrogen,
  (2) lower alkyl of from 1 to about 5 carbon atoms,
  (3) aralkyl, such as benzyl and phenethyl, and
  (4) mononuclear aryl, preferably phenyl;

X represents (a) hydrogen,
(b) halo such as chloro, bromo and iodo,
(c) lower alkyl of from 1 to about 5 carbon atoms,
(d) lower cycloalkyl of from 3 to about 6 carbon atoms, and,
(e) mononuclear aryl, especially phenyl either unsubstituted or substituted preferably with halogen such as chloro or bromo;

Y represents (a) hydrogen,
(b) hydroxy,
(c) lower alkyl of from 1 to about 5 carbon atoms,
(d) lower alkylthio of from 1 to about 3 carbon atoms,
(e) lower alkyl of from 1 to about 5 carbon atoms,
(f) ω,ω,ω-trifluoro-lower alkyl such as trifluoromethyl, trifluoroethyl and the like,
(g) lower cycloalkyl having 3 to about 6 carbons,
(h) mononuclear aryl, preferably phenyl, and
(i)

wherein $R^5$ represents (1) hydrogen, and
(2) lower alkyl of from 1 to about 5 carbon atoms;

$R^6$ represents (1) hydrogen,
(2) lower alkyl either straight or branched chain of from 1 to about 5 carbon atoms, and
(3) substituted lower alkyl having 1 to about 5 carbon atoms containing one or more substituents such as
  (a) hydroxyl,
  (b) lower alkoxy, of from 1 to about 3 carbon atoms,
  (c) ω,ω,ω-trifluoro,
  (d) cycloalkyl having from 3 to about 6 carbons,
  (e) mononuclear aryl, preferably phenyl, unsubstituted or substituted, such as with
    (1) lower alkyl of from 1 to about 5 carbon atoms and
    (2) halo, such as chloro, bromo, iodo, fluoro and
  (f) a heterocyclic substituent, especially a 5 or 6 membered oxygen or nitrogen containing heterocycle as furyl, or pyridyl,
(4) lower alkenyl of from 2 to about 5 carbons,
(5) lower alkynyl of from 3 to about 5 carbons,
(6) lower cycloalkyl of from 3 to about 6 carbons, and
(7) mononuclear aryl, especially phenyl;

$R^5$ and $R^6$ when taken together, and each represents lower alkyl, they can be linked together to form a cyclic structure with the nitrogen atom to which they are attached, particularly a 5- to 8- membered ring, advantangeously such as 1-pyrrolidinyl, piperidino, hexahydro-1-azepinyl, octahydro-1-ezocinyl and the like, and $R^5$ and $R^6$ when taken together, and each represents lower alkyl, they can be linked together through another nitrogen atom to form a cyclic structure with the nitrogen atom to which they are attached, such as 1-lower-alkyl-4-piperazinyl;

X and Y can be linked together to form a 4-membered carbon chain either unsaturated or saturated, either unsubstituted or substituted with, for example, a halogen to form compounds such as tetrahydroquinoxaline or quinoxaline derivatives;

$R^3$ represents (a) hydrogen,
(b) lower alkyl, either straight or branched (but preferably, straight) chain or cyclic (3- to 6-membered rings) and either unsubstituted or substituted with one or more substituents such as
  (1) hydroxyl,
  (2) mononuclear aryl, preferably phenyl, either unsubstituted or substituted, the substituent preferably being lower alkyl or halogen, such as chloro, bromo, or fluoro
(c) lower alkenyl such as allyl, and the like;

(d) mononuclear aryl, preferably phenyl either unsubstituted or substituted with such as halogen or lower alkyl;

(e) amino $R^4$ can be (a) hydrogen,
(b) lower alkyl of from 1 to about 5 carbon atoms, and
(c) lower alkenyl of from 2 to about 5 carbon atoms, In the preceding definition of the variable radicals X, Y, Z, $R^3$ and $R^4$, the lower alkyl radicals having from 1 to 5 carbon atoms embrace methyl, ethyl, n- and iso-propyl, butyl, isobutyl, 1-methylpropyl, 2-methylpropyl, amyl, isomyl, 2-methylbutyl, 1-ethylpropyl, and the like.

The pyrazinamidoguanidine compounds of this invention are useful diuretic and saluretic agents in the treatment of edema, hypertension and other diseases known to be responsive to diuretic therapy.

The compounds of this invention can be made by a variety of methods two of which, methods A and B, are discussed in detail below. In the reaction schemes employed to illustrate these especially useful methods, the radicals X, Y, Z, $R^3$ and $R^4$ are as defined above.

METHOD A

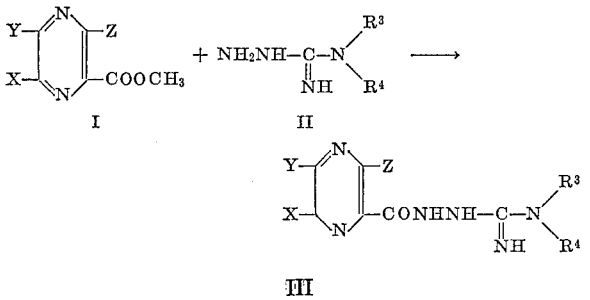

Synthesis by Method A involves the reaction of a pyrazinoic acid ester of the type illustrated by compound I with aminoguanidine of the type illustrated by compound II. The methyl ester is shown for illustrative purposes only since the ester may be that of certain other alcohols, especially lower aliphatic alcohols, advantageously lower alkanols. It will be noted that this alkoxy (ester) radical does not appear in the desired end product.

The above synthesis is preferably carried out under anhydrous conditions either with or without a solvent such as methanol, ethanol, isopropyl alcohol or other solvents. The reaction can be carried out at room temperature or by heating on a steam bath for 1 minute to 2 hours or longer. The desired product usually is recovered from the cooled reaction mixture by trituration with water. Purification frequently is carried out by converting the product to a salt which can be recrystallized, or the base can be regenerated by addition of aqueous alkali.

METHOD B

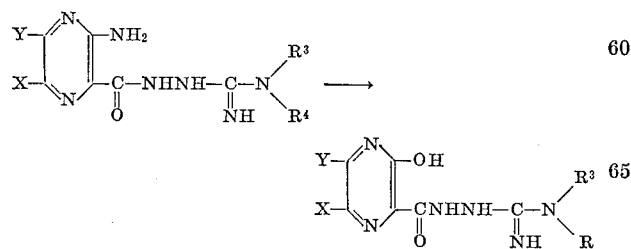

This method is applicable to the preparation of the 3-hydroxypyrazinamidoguanidines. Surprisingly it has been found that diazotization does not effect the aminoguanidine group nor an amino group in the 5-position, i.e., when Y represents amino. It involves the reaction of an aqueous solution of an acid addition salt of a 3-amino-pyrazinamidoguanidine with nitrous acid. In general, it is advantageous to suspend the 3-aminopyrazinamidoguanidine compound in water and dissolve it by the addition of two equivalents of an acid. It is preferable to choose an acid that forms a water soluble salt, e.g., methanesulfonic acid. The solution is cooled to the range of 0° C. to 10° C. and treated with an alkali metal nitrite such as sodium or potassium nitrite and after the diazotization is complete the solution is heated to a temperature of 50° C. to 80° C.

The 3-aminopyrazinamidoguanidine compounds used as starting materials in Method B are prepared by the reaction of an alkyl 3-aminopyrazinoate with an aminoguanidine, or by the reaction of a pyrazine[1,4][1,3]oxazin-4-one with an aminoguanidine followed by hydrolysis of the 3-acylaminopyrazinamidoguanidine.

PREPARATION OF INTERMEDIATES

The method of preparation of the various 3-Z-pyrazinoic acid esters employed as starting materials in Method A described above are dependent on the nature of the 3-Z-substituent and are described below:

(1) Alkyl 3-hydroxy-5-Y-6-X-pyrazinoates

The alkyl 3-hydroxypyrazinoate compounds are prepared by treating a cooled solution of the corresponding alkyl 3-aminopyrazinoate in concentrated sulfuric acid or methanesulfonic acid with a cooled concentrated acid solution of an alkali metal nitrite such as sodium or potassium nitrite. After the addition of the nitrite is complete, the reaction mixture is stirred at 0° C. to 10° C. for about 15 minutes to 2 hours, and then poured onto crushed ice. The product is recovered by extracting the reaction mixture with a solvent, and extracting the organic phase with an aqueous base, which on acidification precipitates the alkyl 3-hydroxypyrazinoate compound which is purified by recrystallization.

In many cases, particularly wherein the molecule carries a 5-substituent, the desired product precipitates directly on pouring the reaction mixture onto crushed ice. Thus the product is isolated by filtration, washing with water, drying and recrystallizing.

(2) Alkyl 3-alkoxy-5-Y-6-X-pyrazinoates (a) The alkyl 3-lower-alkoxypyrazinoate compounds are obtained by preparing a cold solution of an alkyl 3-aminopyrazinoate in an acid such as concentrated sulfuric acid, methanesulfonic acid or the like, and slowly adding thereto a solution of an alkali metal nitrite in cold, concentrated acid. After the addition is complete, the mixture is stirred at 0° C.–10° C. for one hour and then slowly poured with stirring into an excess of a lower alkanol; the reaction mixture then is refluxed for 1 to 3 hours. The product can be recovered by extracting the reaction mixture with a solvent and removing the solvent by distillation. The residue is purified by recrystallization. By the same procedure there is produced 3-(phenyl-loweralkoxy) compounds, for example, 3-benzyloxy.

(b) Another method for preparing alkyl 3-alkoxypyrazinoate compounds is from the corresponding alkyl 3-bromopyrazinoate compounds by reaction with the sodium salt of an alkanol.

(3) Alkyl 3-bromo-5-Y-6-X-pyrazinoates

The alkyl 3-bromopyrazinoates employed in 2(b) and in parts 4 and 5 which follow can be prepared by treating a suspension of an alkyl 3-aminopyrazinoate in a mixture of bromine, hydrobromic acid and acetic acid at a temperature of 0° C.–10° C. with an aqueous solution of an alkali metal nitrite. Stirring is continued at a temperature below 0° C. for about ½–2 hours, after which time the excess bromine is destroyed, suitably by the addition of an alkali metal bisulfite. The product usually is recovered by filtration and purified by recrystallization.

(4) Alkyl 3-mercapto-5-Y-6-X-pyrazinoates

The alkyl 3-mercaptopyrazinoate compounds are prepared by heating a suspension of the corresponding alkyl 3-bromopyrazinoate, sodium sulfide and sulfur in an alcoholic solution. The product can be recovered, for example, by distilling off the solvent, adding water, acidifying, and filtering off the precipitated product. The product can be purified by dissolving in dilute aqueous alkali and reprecipitating with acid.

(5) Alkyl 3-substituted thio-5-Y-6-X-pyrazinoates

The 3 - alkylthio-, 3 - aralkylthio-, and 3 - arylthio-pyrazinoate esters are prepared by the reaction of an alkyl 3-bromopyrazinoate with the alkali metal salts of an alkyl mercaptan, an aralkyl mercaptan or an aryl mercaptan, respectively. Conveniently, the alkyl 3-bromopyrazinoate is added to an aqueous alcoholic solution of the appropriate mercaptan at room temperature with rapid stirring; stirring then is continued for ½ to 3 hours.

The intermediate alkyl 3-aminopyrazinoates and substituted aminoguanidines are prepared by the methods described in Belgian Patent No. 498,330, published on Oct. 11, 1962, and Belgian Patents Nos. 639,386 and 639,393, both published on Apr. 30 the disclosures of which are included herein by reference.

In some instances, it may be desirable to make a pharmaceutically acceptable acid salt of the compounds of this invention by reacting the free base with an acid such as hydrochloric, hydrobromic, phosphoric, sulfuric, maleic, tartaric, salicyclic, citric and the like. These salts are to be considered as included in this invention and also included within the scope of the claims.

The products of this invention can be administered to man or animals in the form of pills, tablets, capsules, elixirs, injectable preparation and the like and can comprise one or more of the compounds of this invention as the only essential active ingredient of the pharmaceutical formulation, or as mentioned above, the novel compound(s) can be combined in pharmaceutical formulations with other diuretic agents or, indeed, other therapeutic agents.

The compounds of this invention are advantageously administered at a dosage range of from about 5 mg. to about 750 mg. or at somewhat higher or lower dosage at the physician's discretion, preferably on a 2 to 4 times a day regimen.

The following Examples 1–52 describe the preparation of the alkyl 3-Z-pyrazinoates, compounds I, that can be employed in Method A to synthesize the novel products of this invention, the preparation of which is described beginning with Example 53. All melting points are corrected values.

EXAMPLE 1

Methyl 3-hydroxy-6-chloropyrazinoate

Keeping the temperature at 25° C., methyl 3-amino-6-chloropyrazinoate (4.6 g., 0.02 mole) is dissolved in concentrated sulfuric acid (15 mg.). The solution is stirred and cooled to 0° C.; then a solution of sodium nitrite (1.6 g., 0.02 mole), dissolved in cold concentrated sulfuric acid (15 ml.), is added slowly. After addition is complete, the mixture is stirred at 0–5° C. for 30 minutes and then poured, with stirring, into crushed ice. The resulting solution is extracted with chloroform using three 200 ml. portions. The combined chloroform extracts are extracted with a sodium hydroxide solution (25 ml. of 2.5 N solution). Upon acidification of the aqueous solution, 2.6 g. (53%) of methyl 3-hydroxy-6-chloropyrazinoate separates. Recrystallization from hexane gives material that melts at 120.5–121.5° C.

*Analysis.*—Calculated for $C_6H_5ClN_2O_3$ (percent): C, 38.29; H, 2.67; N, 14.87. Found (percent): C, 38.39; H, 2.59; N, 14.89.

EXAMPLE 2

Methyl 3-hydroxy-5-ethylamino-6-chloropyrazinoate

To a stirred solution of methyl 3-amino-5-ethylamino-6-chloropyrazinoate (23.0 g., 0.1 m.) in concentrated sulfuric acid (75 ml.) maintained at 5–10° C. is added a cold solution of sodium nitrite (6.9 g., 0.1 m.) in concentrated sulfuric acid (75 ml.). The reaction is stirred for 1.5 hours without cooling and then poured into ice (1000 g.) which causes a pale yellow solid to precipitate. The precipitate is recovered by filtration and dried to yield 17.2 g. (75%) of product melting at 180–184° C. The pure product is obtained by crystallization from an ethanol-water (1:1) mixture and has a melting point of 182–184° C.

*Analysis.*—Calculated for $C_8H_{10}N_3O_3Cl$ (percent): C, 41.48; H, 4.35; N, 18.14. Found (percent): C, 41.06; H, 4.46; N, 17.96.

EXAMPLE 3

Methyl 3-hydroxy-5-dimethylamino-6-chloropyrazinoate

Methyl 3 - amino-5-dimethylamino-6-chloropyrazinoate (4.6 g., 0.02 mole) is added to 8 ml. of concentrated hydrochloric acid, and the mixture is cooled to 3° C. A solution of 1.5 g. (0.022 mole) of sodium nitrite in 10 ml. of water is added during 30 minutes while the reaction mixture is maintained at 3–5° C. The mixture is allowed to warm to room temperature during 45 minutes. The solid product is collected and dissolved in 40 ml. of 5% sodium hydroxide solution. The solution then is filtered and acidified to obtain 1.6 g. of product, M.P. 137–140° C. Recrystallization from methanol gives 0.9 g. of methyl 3 - hydroxy-5-dimethylamino-6-chloropyrazinoate, M.P. 140.5–141.5° C.

*Analysis.*—Calculated for $C_8H_{10}ClN_3O_3$ (percent: N, 18.14. Found (percent): N, 18.12.

Following substantially the procedure described in Examples 1, 2 and 3 but employing an equimolecular quantity of the appropriate methyl 3-amino-5-Y-6-X-pyrazinoates as starting materials there is obtained the corresponding methyl 3-hydroxy-5-Y-6-X-pyrazinoates depicted in Table 1.

TABLE 1

$$Y\text{-pyrazine-}NH_2, COOCH_3, X \xrightarrow{\text{① } NaNO_2/H^+ \quad \text{② } H_2O} Y\text{-pyrazine-}OH, COOCH_3, X$$

| Example | X | Y |
|---|---|---|
| 4 | Cl | H |
| 5 | Cl | $CH_2=CHCH_2NH-$ |
| 6 | Cl | $C_6H_5\text{-}CH_2NH-$ |
| 7 |   | $-(CH_2)_4-$ |
| 8 | Cl | $CH_3CH_2CH_2NH-$ |
| 9 | Cl | $CH_2OCH_2CH_2NH-$ |
| 10 | Cl | cyclopentyl-NH— |
| 11 | Cl | $CH_3S-$ |
| 12 | Cl | $NH_2-$ |

EXAMPLE 13

Methyl 3-methoxy-6-chloropyrazinoate

Methyl 3-amino-6-chloropyrazinoate (18.7 g., 0.1 mole) is added slowly to a stirred solution of concentrated sulfuric acid (75 ml.) at 0° C.–5° C. A solution of sodium nitrite (9 g., 0.13 mole) in concentrated sulfuric acid (75 ml.) at 10° C. is added slowly with vigorous mechanical stirring. After the addition is complete, the mixture is stirred at 5° C.–10° C. for one hour and then slowly poured with stirring into methanol (1500 ml.) The solution is refluxed for 1½ hours, concentrated by evaporation under vacuum to a volume of 500 ml. and then poured onto crushed ice (1500 g.) The solution is extracted with chloroform (750 ml.) and the chloroform extract dried over anhydrous sodium sulfate. The solvent is removed by distillation under vacuum. The residual yellow oil is dissolved in hot ethanol (50 ml.), cooled, and water gradually added until the product separates. The yield of methyl 3-methoxy-6-chloropyrazinoate is 2.6 g. (13%), M.P. 45° C. This material may be purified, but is normally used without further purification in the preparation of the pyrazinamidoguanidine.

Following substantially the procedure described in Example 13, but employing an equimolecular quantity of they appropriate methyl 3-amino-5-Y-6-X-pyrazinoates as starting materials, diazotizing and then decomposing the diazonium salt with an alcohol having the formula $R^7OH$ in place of the methanol used in Example 13, there is obtained the corresponding methyl 3-alkoxy-5-Y-6-X-pyrazinoates in Table II.

TABLE II

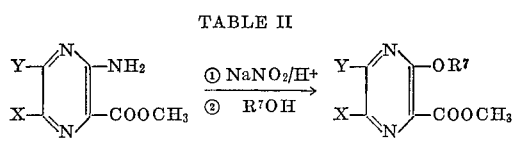

| Ex. | X | Y | $R^7$ |
|---|---|---|---|
| 14 | H | $CH_3$ | $CH_3-$ |
| 15 | $C_2H_5$ | H | $CH_3-$ |
| 16 | H | $CF_3$ | $C_2H_5-$ |
| 17 | H | OH | $CH_3CH_2CH_2-$ |
| 18 | H | $OCH_3$ | $n-C_4H_9-$ |
| 19 | Cl | $-NH-CHCH_2CH_3$ with $CH_3$ branch | $CH_3-$ |
| 20 | Cl | pyrrolidinyl | $n-C_5H_{11}-$ |
| 21 | Cl | $-SCH_3$ | $CH_3$ |
| 22 | phenyl | $-N(CH_3)_2$ | $CH_3$ |
| 23 | Cl | $CH_3$ | phenyl-$CH_2-$ |

EXAMPLE 24

Methyl 3-bromo-6-chloropyrazinoate

Methyl 3-amino-6-chloropyrazinoate is suspended in a mixture of 48% hydrobromic acid (114 ml.) and acetic acid (40 ml.). The mixture is cooled to 0° C., stirred and treated, dropwise over 45 minutes with a solution of bromine (15 ml.) in acetic acid (30 ml.). Then a solution of sodium nitrite (17.4 g.) in water (30 ml.) is added, keeping the temperature below 0° C. Stirring is continued for 30 minutes after the addition is complete and the excess bromine then is destroyed by the dropwise addition of 30% aqueous sodium bisulfite solution (150 ml.). The product which separates is removed by filtration, washed with cold water and dried. The yield of methyl 3-bromo-6-chloropyrazinoate is 14.2 g. (56%), M.P. 35–36° C. Recrystallization from water gives material with the same melting point.

*Analysis.*—Calculated for $C_6H_4N_2O_2BrCl$ (percent): C, 28.66; H, 1.60; N, 11.14. Found (percent): C, 28.53; H, 1.67; N, 10.83.

Employing substantially the same procedure described in Example 24, but substituting for methyl 3-amino-6-chloropyrazinoate as starting material an equimolecular quantity of the appropriate methyl 3-amino-5-Y-6-X-pyrazinoate identified in Table III there is obtained the methyl 3-bromo-5-Y-6-X-pyrazinoates having the values of Y and X as depicted in Table III.

| Example | X | Y |
|---|---|---|
| 25 | Br | H |
| 26 | phenyl | H |
| 27 | Cl | $C_2H_5NH-$ |
| 28 | Br | phenyl |
| 29 | $CH_3$ | $CH_3$ |
| 30 | H | phenyl |
| 31 | cyclopropyl | H— |
| 32 | H | phenyl |
| 33 | Cl-phenyl- | H |
| 34 | H | $(CH_3)_2CHNH-$ |
| 35 | Cl | $n-C_6H_{13}NH-$ |
| 36 | Cl | cyclopentyl-NH— |
| 37 | Cl | $CH_3-N\underset{}{\diagup}N-$ (piperazinyl) |

EXAMPLE 38

Methyl 3-mercapto-6-chloropyrazinoate

A suspension of sodium sulfide (4.8 g., 0.02 mole) and sulfur (5.9 g., 0.156 g. atoms) in ethanol (40 ml.) is refluxed for 30 minutes. Methyl 3-bromo-6-chloropyrazinoate from Example 24 (5.0 g., 0.02 mole) is added to the solution, and the mixture is refluxed for 30 minutes. The solution is evaporated under vacuum to volume of 20 ml. Water (60 ml.), is added and the mixture is acidified with dilute hydrochloric acid. The product that separates is removed by filtration, dissolved in dilute sodium hydroxide, filtered and then acidified with dilute hydrochloric acid. The methyl 3-mercapto-6-chloropyrazinoate that separates is removed by filtration, washed with water, and dried. The yield is 3.5 g. (87%), M.P. 80° C. This material is sufficiently pure for use in the preparation of the corresponding pyrazinamidoguanidine.

EXAMPLE 39

Methyl 3-mercaptopyrazinoate

A suspension of sodium sulfide (9.0 g., 0.0375 mole) and sulfur (2.4 g., 0.075 g. atoms) in methanol (100 ml.) is refluxed for 30 minutes. Methyl 3-bromopyrazinoate (8 g., 0.037 mole) is added to the resulting solution and the mixture is refluxed for 30 minutes. The solution is evaporated under vacuum to a volume of 30 ml.; then water (100 ml.) is added and the mixture is acidified with hydrochloric acid. The bright red product that separates is removed by filtration, dissolved in dilute sodium hydroxide, filtered, and acidified with dilute hydrochloric acid. The methyl 3-mercaptopyrazinoate is removed by filtration, washed with water and dried. The yield is 3 g. (48%), M.P. 124–125° C. (dec.). This material is sufficiently pure for use in the preparation of the corresponding pyrazinamidoguanidine.

EXAMPLE 40

Methyl 3-mercapto-5-phenyl-6-bromopyrazinoate

Employing essentially the same procedure as described in Example 38 but substituting an equimolar amount of methyl 3,6-dibromo-5-phenylpyrazinoate prepared in Example 28 for methyl 3-bromo-6-chloropyrazinoate there is produced the corresponding methyl 3-mercapto-5-phenyl-6-bromopyrazinoate.

EXAMPLE 41

Methyl 3-mercapto-5-ethylamino-6-chloropyrazinoate

Following substantially the same procedure as shown in Example 39, except using methyl 3-bromo-5-ethylamino-6-chloropyrazinoate (from Example 27) in place of methyl 3-bromopyrazinoate there is produced methyl 3-mercapto-5-ethylamino-6-chloropyrazinoate. The compound is recrystallized from hexane and has a melting point of 136–138° C. when pure.

Analysis.—Calculated for $C_8H_{10}N_3O_2ClS$ (percent): C, 38.79; H, 4.07; N, 16.96. Found (percent): C, 38.77; H, 4.11; N, 16.89.

EXAMPLE 42

Methyl 3-methylmercapto-6-bromopyrazinoate

A solution of methanol (75 ml.) and 20% sodium hydroxide (5.3 ml., 0.026 mole) is stirred, and gaseous methyl mercaptan is admitted below the surface until 1.28 g. (0.0265 mole) has been absorbed. The solution is stirred rapidly and methyl 3,6-dibromopyrazinoate, from Example 25, (7.8 g., 0.026 mole) is added as rapidly as possible. Stirring is continued for 30 minute after the addition is complete. During this time a solid begins to separate. Water (100 ml.) is added and the precipitated methyl 3-methyl-mercapto-6-bromopyrazinoate is removed by filtration and dried. The yield is 5.6 g. (80%), M.P. 127–130° C. Recrystallization from ethanol gives material having a melting point of 136–137° C.

Analysis.—Calculated for $C_7H_7BrN_2O_2S$ (percent): C, 31.95; H, 2.70; N, 10.64. Found (percent): C, 32.36; H, 2.70; N, 11.34.

Employing essentially the same procedure as described in Example 42 but substituting for methyl 3,6-dibromopyrazinoate and methyl mercaptan equimolecular quantities of the appropriate methyl 3-bromo-5-Y-6-X-pyrazinoate identified in Table IV and the mercaptan designated $R^8SH$, there is obtained the corresponding methyl 3-$SR^8$-5-Y-6-X-pyrazinoates identified in Table IV.

TABLE IV

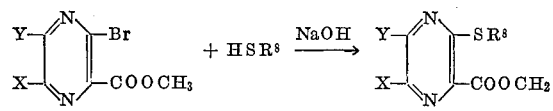

| Example | Starting material prepared in example | X | Y | R8 |
|---|---|---|---|---|
| 43 | 29 | CH₃ | CH₃ | C₂H₅ |
| 44 | 30 | H | cyclopropyl | n-C₄H₉— |
| 45 | 31 | cyclopropyl | H | n-C₅H₁₁— |
| 46 | 32 | H | phenyl | phenyl |
| 47 | 33 | Cl-phenyl | H | phenyl-CH₂— |
| 48 | 34 | H | (CH₃)₂CHNH— | phenyl-CH₂CH₂— |
| 49 | 35 | Cl | n-C₆H₁₃NH— | phenyl-CH₂— |
| 50 | 36 | Cl | cyclopentyl-NH— | CH₃ |
| 51 | 37 | Cl | CH₃-N(piperazinyl)N— | CH₃ |
| 52 | 26 | phenyl | H | phenyl |

The following examples are illustrative of the methods by which the products of this invention can be prepared and are not to be considered as limiting the invention to the particular procedural conditions employed or to the particular compounds prepared thereby. All melting points are corrected values.

PREPARATION OF PRODUCTS ACCORDING TO METHOD A—EXAMPLE 53

3-hydroxy-6-chloropyrazinamidoguanidine hydrochloride

To a 3-liter flask, protected from the atmosphere by a drying tube, containing boiling absolute ethanol (2 liters), is added aminoguanidine hydrochloride (122 g., 1.1 moles). The heat source is removed and a solution of sodium ethoxide, prepared from sodium (23 g., 1.0 mole) in absolute ethanol (500 ml.), is added slowly with stirring. Sodium chloride precipitates. The mixture is allowed to cool to room temperature, and methyl 3-hydroxy-6-chloropyrazinoate (188.6 g., 1.0 mole) (Example 1) is added. The mixture is concentrated to about 600 ml. of over about 6 hours on a rotary vacuum evaporator at 25–35° C., and then allowed to stand under a nitrogen atmosphere. The resulting residue is extracted successively with cold absolute alcohol (400 ml.) and water (2× 300 ml.). The solid is pressed as dry as possible and finally dried in a vacuum oven to yield (3-hydroxy-6-chloropyrazinamido)guanidine, M.P. 259–260° C.

(3-hydroxy-6-chloropyrazinamido)guanidine (10 g.) is powdered in a mortar, mixed with 200 ml. of concentrated hydrochloric acid (100 ml.) and heated on a steam bath with stirring for 15 minutes. The hot mixture is then cooled to 0° C. The product that separates, (3-hydroxy-6-chloropyrazinamido)guanidine hydrochloride, is collected by filtration and dried.

Other salts such as the maleate, sulfate, or phosphate can be similarly prepared.

Employing the method of Example 53, but substituting for the methyl 3-hydroxy-6-chloropyrazinoate and the aminoguanidine, employed therein equimolar amounts of methyl 3-Z-5-Y-6-X-pyrazinoate and 1-amino-3-$R^3$-3-$R^4$-guanidine respectively, there are produced the corresponding 1-(3-Z-5-Y-6-X-pyrazinamido)-3-$R^3$ - $R^4$ - guanidines identified in Table V.

TABLE V

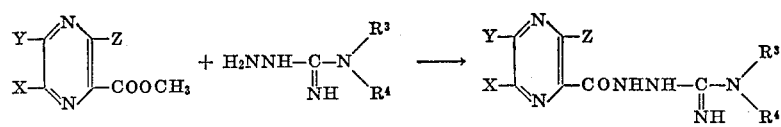

| Example | Starting material found in example | X | Y | Z | $R^3$ | $R^4$ |
|---|---|---|---|---|---|---|
| 54 | 1 | Cl | H | OH | $CH_3$ | $CH_3$ |
| 55 | 2 | Cl | $C_2H_5$—NH— | OH | H | H |
| 56 | 3 | Cl | $(CH_3)_2N$— | OH | H | H |
| 57 | 4 | I | H | OH | H | $CH_3$ |
| 58 | 5 | Cl | $CH_2$=CH—$CH_2$NH— | OH | H | H |
| 59 | 6 | Cl | C6H5—$CH_2$NH— | OH | H | H |
| 60 | 7 |  | —$(CH_2)_4$— | OH | H | C6H5 |
| 61 | 8 | Cl | n-$C_3H_7$NH— | OH | H | H |
| 62 | 9 | Cl | $CH_3$O$CH_2CH_2$NH— | OH | H | H |
| 63 | 10 | Cl | (pyrrolidinyl)—NH— | OH | H | H |
| 64 | 11 | Cl | $CH_3$S— | OH | H | C6H5—$CH_2$— |
| 65 | 12 | Cl | $NH_2$ | OH | H | H |
| 66 | 13 | Cl | H | —O$CH_3$ | H | H |
| 67 | 14 | H | $CH_3$ | —O$CH_3$ | H | HO$CH_2CH_2$— |
| 68 | 15 | $C_2H_5$ | H | —O$CH_3$ | H | $H_2N$— |
| 69 | 16 | H | $CF_3$ | —O$C_2H_5$ | H | $CH_3$ |
| 70 | 17 | H | OH | n-$C_3H_7$O— | H | C6H5—$CH_2$— |
| 71 | 18 | H | —O$CH_3$ | n-$C_4H_9$O— | H | $H_2N$— |
| 72 | 19 | Cl | $CH_3CH_2\overset{CH_3}{\underset{}{CH}}$—NH— | $CH_3$O— | H | H |
| 73 | 20 | Cl | (pyrrolidinyl)N— | n-$C_5H_{11}$O— | H | H |
| 74 | 21 | Cl | $CH_3$S— | $CH_3$O— | H | HO$CH_2CH_2$— |
| 75 | 22 | C6H5 | $(CH_3)_2N$— | $CH_3$O— | H | H |
| 76 | 23 | Cl | $CH_3$ | C6H5—$CH_2$S— | $CH_3$ | $CH_3$ |

TABLE V—Continued

| Example | Starting material found in example | X | Y | Z | R³ | R⁴ |
|---|---|---|---|---|---|---|
| 77 | 38 | Cl | H | HS— | H | C₆H₅—CH₂— |
| 78 | 39 | H | H | HS— | H | H₂N— |
| 79 | 40 | Br | C₆H₅— | HS— | CH₃ | CH₃ |
| 80 | 41 | Cl | C₂H₅NH— | HS— | H | H |
| 81 | 42 | Br | H | CH₃S— | H | H |
| 82 | 43 | CH₃ | CH₃ | C₂H₅S— | H | HOCH₂CH— |
| 83 | 44 | H | C₆H₅— | n-C₄H₉S— | H | C₆H₅— |
| 84 | 45 | cyclopropyl | H | n-C₅H₁₁S— | H | NH₂ |
| 85 | 46 | H | C₆H₅— | C₆H₅—S— | CH₃ | CH₃ |
| 86 | 47 | Cl-C₆H₄— | H | C₆H₅—CH₂S— | H | C₆H₅—CH₂— |
| 87 | 48 | H | (CH₃)₂CH—NH— | C₆H₅—CH₂CH₂S— | H | H |
| 88 | 49 | Cl | n-C₆H₁₃NH— | C₆H₅—CH₂S— | H | H |
| 89 | 50 | Cl | cyclopentyl-NH— | CH₃S— | H | H |
| 90 | 51 | Cl | CH₃—N(piperazinyl)N— | CH₃S— | H | H |
| 91 | 52 | C₆H₅— | H | C₆H₅—S— | CH₃ | CH₃ |

PREPARATION OF PRODUCTS ACCORDING TO METHOD B—EXAMPLE 92

(3-hydroxy-6-chloropyrazinamido)guanidine (3 - amino-6-chloropyrazinamido)guanidine hydrochloride (4.58 g., 0.02 mole) is dissolved in water, 50 ml.) and the solution cooled to 0° C. Methanesulfonic acid (4 g.) is added, and with the temperatures maintained below 5° C., sodium nitrite (1.50 g., 0.022 mole) dissolved in water (10 ml.) is added slowly with stirring. The addition requires 15 minutes. The reaction mixture is allowed to stand 2 hours while it warms to room temperature, when it is neutralized with dilute sodium hydroxide. After cooling to 0° C., the precipitated yellow solid is removed by filtration. The product is purified by dissolving in dilute aqueous hydrochloric acid and precipitated by adding dilute aqueous sodium hydroxide. After reprecipitating a second time in the same manner, removing by filtration, washing with water and drying, the yield of (3-hydroxy-6-chloropyrazinamido)guanidine is 600 mg. (28%), M.P. 259–260° C.

*Analysis.*—Calculated for $C_6H_7ClN_6O_2$ (percent): C, 31.24; H, 3.06; N, 36.44. Found (percent): C, 39.08; H, 3.06; N, 35.86.

Employing substantially the method of Example 92 but substituting for the (3-amino-6-chloropyrazinamido)guanidine an equimolar amount of (3-amino-5-NR⁵R⁶-6-chloropyrazinamido)guanidine there are produced the (3-hydroxy-5-NR⁵R⁶-6-chloropyrazinamido)guanidines identified in Table VI.

TABLE VI $$\underset{R^6}{\overset{R^5}{N}}-\underset{Cl}{\overset{N}{\diagup}}\underset{N}{\overset{}{\diagdown}}-NH_2 \atop CONHNH-\underset{NH}{\overset{}{C}}-NH_2 \longrightarrow$$

$$\underset{R^6}{\overset{R^5}{N}}-\underset{Cl}{\overset{N}{\diagup}}\underset{N}{\overset{}{\diagdown}}-OH \atop CONHNH-\underset{NH}{\overset{}{C}}-NH_2$$

| Example | R⁵ | R⁶ |
|---|---|---|
| 93 | N-pyridyl-CH₂— | H |
| 94 | CF₃CH₂— | H |
| 95 | —(CH₂)₆— | |
| 96 | (CH₃)₂NCH₂CH₂— | H |
| 97 | furyl-CH₂— | H |
| 98 | cyclopropyl-CH₂— | H |

EXAMPLE 99

Dry filled capsule containing 50 mg. of active ingredient

| | Per capsule, mg. |
|---|---|
| (3-hydroxy - 6 - chloropyrazinamido)guanidine hydrochloride | 50 |
| Lactose | 272 |
| Magnesium stearate | 2 |
| Mixed powders | 325 |

Mix the (3-hydroxy - 6 - chloropyrazinamido)guanidine hydrochloride from Example 53, lactose and magnesium stearate and reduce to a No. 60 mesh powder. Encapsulate, filling 325 mg. in each No. 2 capsule.

The above formulation can be employed to prepare capsules of the other novel compounds of this invention hereinbefore described.

What is claimed is:

1. A member selected from the group consisting of a compound of structural formula

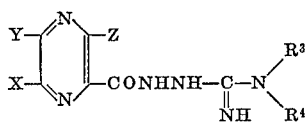

and pharmaceutically acceptable salts thereof, wherein
Z is a member selected from the group consisting of
  (a) $OR^7$, wherein $R^7$ is a member selected from the group consisting of
    (1) hydrogen,
    (2) lower alkyl,
    (3) phenyl-lower alkyl and
  (b) $SR^8$, wherein $R^8$ is a member selected from the group consisting of
    (1) hydrogen,
    (2) lower alkyl,
    (3) phenyl-lower alkyl and
    (4) phenyl;
X is a member selected from the group consisting of
  (a) hydrogen,
  (b) halogen,
  (c) lower alkyl,
  (d) cycloalkyl having from 3 to 6 carbons,
  (e) phenyl, and
  (f) halo-phenyl;
Y is a member selected from the group consisting of
  (a) hydrogen,
  (b) hydroxy,
  (c) lower alkoxy,
  (d) lower alkylthio,
  (e) lower alkyl,
  (f) $\omega,\omega,\omega$-trifluoro-lower alkyl,
  (g) cycloalkyl having from 3 to 6 carbons,
  (h) phenyl, and (i) 

wherein
$R^5$ is a member selected from the group consisting of
    (1) hydrogen,
    (2) lower alkyl, and
$R^6$ is a member selected from the group consisting of
    (1) hydrogen,
    (2) lower alkyl,
    (3) hydroxy-lower alkyl,
    (4) $\omega,\omega,\omega$-trifluoro-lower alkyl,
    (5) [lower(cycloalkyl - alkyl),] ($C_{3-6}$ - cycloalkyl)-lower alkyl,
    (6) [mononuclear aryl] phenyl-lower alkyl,
    (7) lower alkyl - [mononuclear aryl]phenyl - lower alkyl,
    (8) halo-[mononuclear aryl]phenyl-lower alkyl,
    (9) lower alkenyl,
    (10) lower alkynyl,
    (11) lower (alkoxyalkyl),
    (12) cycloalkyl having from 3 to 6 carbons,
    (13) phenyl,
    (14) (5,6 membered, O or N containing heterocyclic)-lower alkyl;
$R^5$ and $R^6$ when linked together represent a member selected from the group consisting of 5 to 8 membered heterocyclic rings containing one nitrogen atom, and
$R^5$ and $R^6$ when linked together through a second nitrogen atom represent a member selected from a group consisting of 6-membered heterocyclic rings containing two nitrogen atoms;
X and Y when linked together form with the pyrazine moiety a member selected from the group consisting of a quinoxaline and a tetrahydroquinoxaline compound;
$R^3$ is a member selected from the group consisting of
  (a) hydrogen,
  (b) lower alkyl,
  (c) hydroxy-lower alkyl,
  (d) phenyl,
  (e) phenyl-lower alkyl,
  (f) cycloalkyl having 3 to 6 carbons,
  (g) amino,
  (h) (halo-phenyl)-lower alkyl,
  (i) (lower alkyl-phenyl)-lower alkyl,
  (j) halo-phenyl, and
  (k) lower alkyl-phenyl;
$R^4$ is a member selected from the group consisting of
  (a) hydrogen,
  (b) lower alkyl, and
  (c) lower alkenyl.

2. A compound as claimed in claim 1, wherein Z is hydroxyl.

3. A compound as claimed in claim 1, wherein Z is lower alkoxy.

4. A compound as claimed in claim 1, wherein Z is phenyl-lower alkoxy.

5. A compound as claimed in claim 1, wherein Z is mercapto.

6. A compound as claimed in claim 1, wherein Z is lower alkylthio.

7. A compound as claimed in claim 1, wherein Z is phenalkylthio.

8. A compound as claimed in claim 1, wherein $R^3$ and $R^4$ are hydrogen.

9. A compound as claimed in claim 1, wherein $R^3$ and $R^4$ are hydrogen, Z is hydroxyl.

10. A compound as claimed in claim 1, wherein $R^3$ and $R^4$ are hydrogen, Z is hydroxyl, and X is halogen.

11. (3-hydroxy-6-chloropyrazinamido)guanidine.

12. (3-hydroxy-5-dimethylamino - 6 - chloropyrazinamido)-guanidine.

13. (3-hydroxy - 5 - amino - 6 - chloropyrazinamido)-guanidine.

14. 1-(3-methoxy - 6 - chloropyrazinamido)guanidine.

15. 3 - mercapto-5-ethylamino-6-chloropyrabinamido)-guanidine.

16. (3-methylthio-6-bromopyrazinamido)guanidine.

17. A process for the preparation of a compound of structural formula

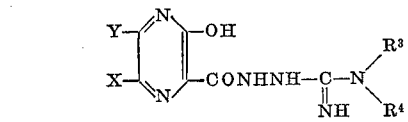

which comprises the reaction of a compound of structural formula
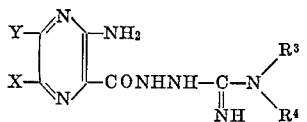
in acid solution with an alkali metal nitrite followed by treatment with water, wherein each of the foregoing structures, X, Y, R³ and R⁴ have the meaning assigned to each of them in claim 1.
References Cited
UNITED STATES PATENTS
3,300,494   1/1967   Ragoe _____ 260—250
NICHOLAS S. RIZZO, Primary Examiner
U.S. Cl. X.R.
424—250